Feb. 15, 1927.

W. HESS

BAND SAW MACHINE

Filed March 30, 1925

1,617,712

Inventor:
Wilhelm Hess
by George C. Henning
Attorney.

Patented Feb. 15, 1927.

1,617,712

UNITED STATES PATENT OFFICE.

WILHELM HESS, OF GERA-REUSS, GERMANY.

BAND-SAW MACHINE.

Application filed March 30, 1925, Serial No. 19,443, and in Germany September 9, 1924.

The present invention relates to improvements in band saw machines, particularly motor operated machines of this type, and it is the principal object of the invention to yieldingly support the motor and to transmit the rotary motion of the motor shaft to the driving wheel of the machine by means of a friction wheel interposed between driving wheel and motor and preferably attached to the shaft of the motor.

Another object of the invention is the provision of a band saw machine equipped with novel and improved braking means for the driving wheel of the machine.

These and other objects and advantages of my invention will become more fully known as the description thereof proceeds, and will then be more specifically pointed out or defined in the appended claims.

In the accompanying drawing, forming a material part of this disclosure:

Figure 1:
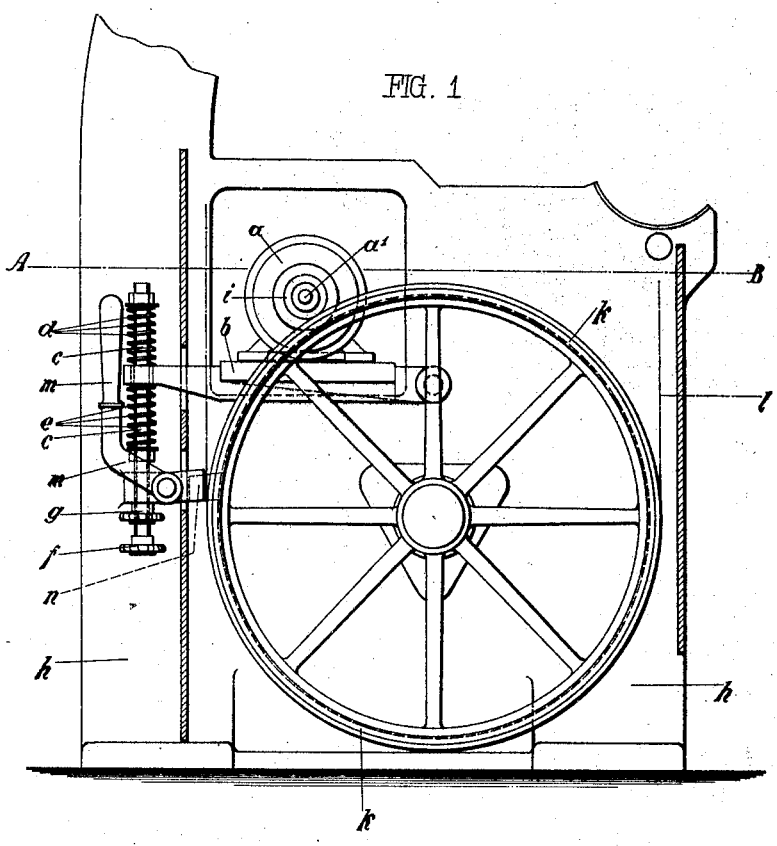
Fig. 1 is a side-view of the band saw machine constructed according to my invention.
Figure 2:
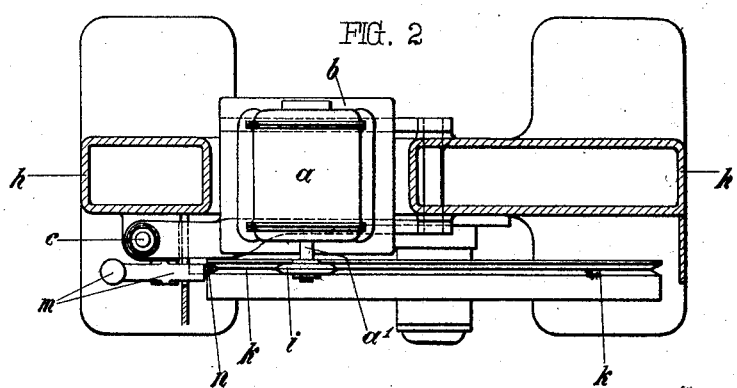
Fig. 2 is a section taken on line A—B of Figure 1.

As illustrated, the motor $a$ of the machine is supported by a base-plate $b$ having a perforated extension at one end, and pivoted to the machine frame at its opposite end. A vertically extending bolt $c$ passes through the perforation of the base-plate extension, and is adjustably held in part $h$ of the machine frame, and carries at its lower end a head or knob $f$ while its adjustment is effected by means of the nut $g$. A spring $d$ is wound about the upper part of the bolt $c$ and rests with its lower end upon the extension of plate $b$ while its upper end engages a collar or nut on the upper end of the bolt. A similar spring $e$ is wound about the lower part of the bolt $c$ and engages at its upper end the underface of the extension of base-plate $b$ while its lower end rests against a collar or nut on the lower end of the bolt. It will be clear that in this manner the base-plate and the motor thereon are yieldingly supported and that the tension of the springs may be properly regulated by the operation of nut $g$.

The axle $a^1$ of the motor $a$ carries a friction-wheel $i$ in frictional engagement with the driving-wheel $k$ of the machine, this wheel is preferably wedge shaped in cross-section and engages a groove formed in the outer periphery of the driving wheel $k$.

The braking device for the driving wheel of the band saw machine comprises a brake lever $m$ pivoted near its lower end to the machine frame, and carrying an exchangeable brake block $n$ adapted to frictionally engage the driving wheel $k$.

The operation of the machine will be entirely clear from the above description and it is to be understood that while I have shown the preferred form of my invention as an example, such changes may be made in the construction of the minor details thereof as fall within the scope of the appended claims without departure from the gist of the invention.

Having thus described my invention, what I claim as new, and desire to secure by Letters Patent is:

1. In a band saw machine, a motor, means for yieldingly supporting the motor, a drive wheel, means for frictionally operating said drive wheel from the motor, and a braking means for the drive-wheel.

2. In a band saw machine, a motor, a base-plate for said motor having a perforated extension at one end, and pivoted to the machine at the opposite end, a bolt passing through the extension, means for cushioning the movements of said base-plate along said bolt, means for frictionally operating the drive-wheel of the machine from said motor, and a braking means for the drive-wheel.

3. In a band saw machine, a motor, a shaft therefor, a base-plate for said motor, an extension on said base-plate at one end thereof, the other end of said plate pivoted to the machine frame, a bolt passed vertically through the extension, springs wound about the upper and lower parts of the bolt above and below said extension, means on said bolt for regulating the tension of said springs, means for frictionally transmitting the motoric force to the drive wheel of the machine, and a braking means for said drive-wheel.

4. In a motor-operated band saw machine, a support for the motor thereof, a perforated extension at one end of said support, pivoted at its opposite end to the machine frame, a vertical bolt slidably passing through the perforation of said extension, springs wound about the upper and lower part of said bolt above and below said extension resting with their inner ends against said extension, collars at the ends of said bolt against which the outer ends of said springs engage, a means for guiding said bolt, a means on said bolt allowing the regulation of the spring tension, a driving wheel, a friction wheel on the motor shaft engaging said driving wheel, and a means for braking said driving wheel.

5. A motor-operated band saw machine comprising a support for the motor thereof, a means for yieldingly cushioning the upward and downward motion of said support, a driving wheel, a means for frictionally transmitting the power developed by the motor to said driving wheel, and a means for braking the driving wheel.

6. A motor-operated band saw machine comprising a base-plate for the motor of the machine hinged to the machine frame at one end, an extension at the opposite end of said base-plate having a perforation, a vertical bolt guided through the perforation of said extension, collars on said bolt, springs wound about said bolt between said extension and said collars, a lower head or knob on said bolt, and an adjusting nut on the lower part of said bolt allowing a regulation of the tension of said springs, means for guiding said bolt on the machine frame, a drive wheel, means for frictionally driving said wheel from the motor, and a brake for said drive-wheel.

7. In a motor-operated band saw machine a shaft for the motor, a friction wheel on said shaft, a drive wheel having a peripheral groove adapted to be engaged by said friction wheel, and a means for braking said drive-wheel.

In testimony whereof I have affixed my signature.

WILHELM HESS.